Figure 1:
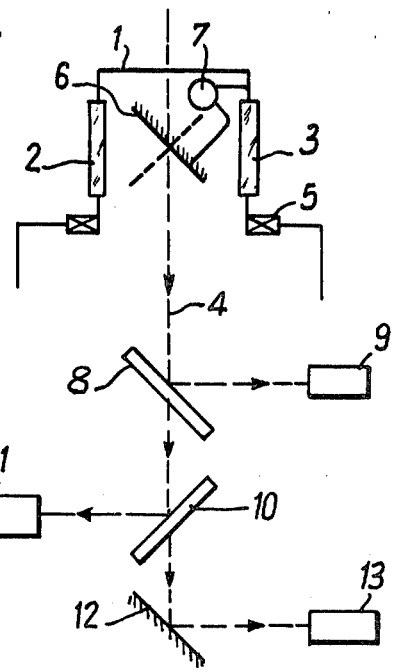

United States Patent [19]
de Ponteves et al.

[11] 4,158,504
[45] Jun. 19, 1979

[54] OPTICAL SIGHTING DEVICES

[75] Inventors: Dominique de Pontevés, Flers; François J. Naussac, Paris; André Dujols, Rueil Malmaison, all of France

[73] Assignee: Societe de Fabrication d'Instruments de Mesure (S.F.I.M.), Massy, France

[21] Appl. No.: 727,120

[22] Filed: Sep. 27, 1976

[30] Foreign Application Priority Data

Oct. 1, 1975 [FR] France .................. 75 30033

[51] Int. Cl.² ................................ G01J 5/04
[52] U.S. Cl. ...................... 356/247; 250/334; 250/347; 350/1.1; 350/166; 356/141; 356/222
[58] Field of Search ........ 350/1, 166, 6.1–6.91; 356/51, 218, 141, 222, 247; 250/234, 237 R, 330, 333, 334, 339, 347, 473; 33/233, 244, 253

[56] References Cited

U.S. PATENT DOCUMENTS

| | | | |
|---|---|---|---|
| 3,160,751 | 12/1964 | Dunning | 350/1 X |
| 3,200,250 | 8/1965 | Bouwers | 250/333 X |
| 3,585,281 | 6/1971 | Jordan | 350/166 X |
| 3,594,578 | 7/1971 | Ohman | 350/1 UX |
| 3,719,424 | 3/1973 | Weischedel | 356/141 |
| 3,859,530 | 1/1975 | Brewster | 250/334 |
| 3,977,793 | 8/1976 | Trotta | 250/347 X |

OTHER PUBLICATIONS

Wolfe et al., "Optical Materials, Films, and Filters for Infrared Instrumentation," Proc. of the IRE–Paper 4.2.3 vol. 47, Sep. 1959, pp. 1540–1546.

Primary Examiner—John K. Corbin
Assistant Examiner—John D. Lee
Attorney, Agent, or Firm—Pollock, Vande Sande & Priddy

[57] ABSTRACT

An optical sighting device consists of a hood with two windows which can transmit radiation within predetermined wavelength ranges to a rotatable reflecting device. The reflecting device receives radiation from one or other of the windows and the hood is rotatable subject to the rotation of the reflecting device. The radiation reflected by the reflecting device is received by two dichroic mirror plates which are suitable for transmitting or reflecting thermal infra-red radiation, visible radiation and near infra-red radiation towards suitable corresponding detectors.

10 Claims, 4 Drawing Figures

OPTICAL SIGHTING DEVICES

The present invention relates to an optical sighting device which can be used for both daytime and night-time sighting. Devices of this kind are particularly used in military equipment, especially for aiming firing devices.

Known optical sighting devices consist of a rotating structure which carries a window able to transmit radiation within a pre-determined wave length range and a reflecting device for reflecting the radiation transmitted through the window along the axis of rotation of the structure. Means are provided to rotate the reflecting device around said axis and to subject the rotation of the structure to the rotation of the reflecting device in such a manner as to keep the window in the position of transmission towards the reflecting device. Normally such a device is designed for either daytime or night-time operation, but it is not designed to operate at will during the day or night.

Known devices which make both night-time and daytime sighting possible employ a sufficiently large reflection device to reflect the incident radiation in two parallel beams towards two receivers or a unit which includes both receivers.

These devices have drawbacks either because of their price, or because of their large size. The object of the present invention is to provide a sighting device which is less costly and easier to make than known devices.

According to the present invention there is provided an optical sighting device comprising a rotatable hood, a first window in the hood which can transmit radiation in a pre-determined range of wavelength, a second window in the hood which can transmit radiation in another pre-determined range of wavelength, a reflecting device capable of receiving radiation transmitted through either the first or the second window and reflecting it parallel to the axis of rotation of the hood, means for rotating the reflecting device about said axis and for rotating the hood in such a manner that the first window is maintained in a position allowing radiation to be transmitted to the reflecting device, and other means to adjust, when desired, the rotation of the hood relative to the reflecting device to allow the second window to be maintained in a position allowing radiation to be transmitted to the reflecting device.

Preferably, the first window consists of a silica plate and the second window consists of a germanium plate.

Preferably, the sighting device also includes two radiation detectors, one of which responds to radiation within the range of transmission of the first window and the other of which responds to radiation within the range of transmission of the second window.

Preferably, the sighting device also includes a third radiation detector which responds to radiation within a range of wavelength which is common to the ranges of transmission of the first and second windows.

Figure 2:
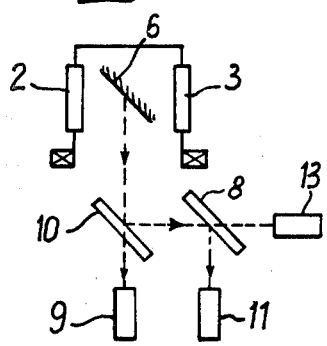
Figure 3:
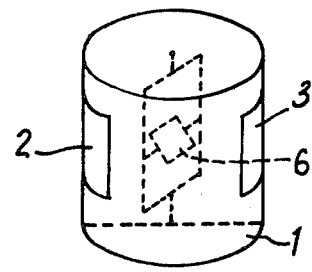
Figure 4:
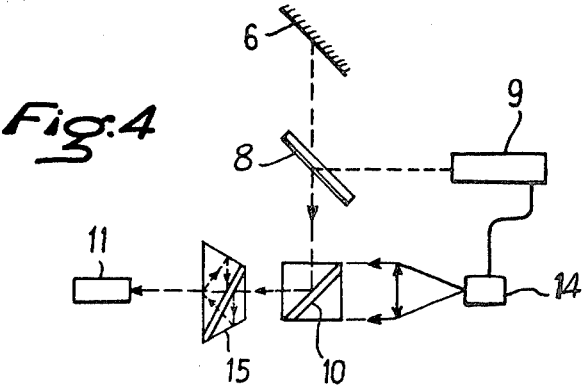

Embodiments of the present invention will now be described by way of example with reference to the accompanying drawing in which:

FIG. 1 is a diagram of a first embodiment;
FIG. 2 is a diagram of a second embodiment;
FIG. 3 is a simplified view of part of a sighting device according to the present invention and
FIG. 4 is a diagram of part of yet another embodiment of a sighting device according to the present invention.

Referring to FIGS. 1 and 3, the sighting device includes a hood 1 equipped with two windows 2 and 3 and installed for rotation around an axis 4 on a bearing 5. Windows 2 and 3 are aligned opposite one another, but other arrangements can be adopted, for example with the windows perpendicular. An optical reflecting device consisting of a mirror 6 is arranged inside the hood 1 to rotate about the axis 4. The mirror 6 may be stabilized by any suitable means or mounted on a universal joint (as shown in FIG. 3) which assures its stability. Means, represented diagrammatically at 7, ensure that the mirror 6 rotates. The rotation of the hood 1 is controlled by the rotation of the mirror 6.

A fixed dichroic mirror plate 8 is arranged on the axis 4 of the hood 1 to receive the radiation reflected by the mirror 6 and to reflect it towards a detector 9 or transmit it to a second dichroic plate 10. The plate 8 is for example a silica plate which has preferably been improved by a multi-dielectric treatment and which reflects infra-red heat radiation towards the detector 9 which is, for example, a thermal sighting telescope. The dichroic plate 10 is arranged in conjunction with the plate 8 to receive visible and near infra-red radiation transmitted through the plate 8 and to reflect the visible radiation towards a detector 11 which is, for example a sighting telescope. The plate 10 is for example a silica plate which has been subjected to a multi-dielectric treatment.

A device 12 for reflecting the image, for example a mirror, is arranged below the plate 10 in order to receive the near infra-red radiation which has traversed the mirror 10 and to reflect it back towards a detector 13 which is, for example, a goniometer. The device 12 can be omitted, the near infra-red radiation being received directly by the detector 13.

The window 2 is made from silica and allows radiation of wavelengths less than 2.6 microns to be transmitted through it and the window 3 is made from germanium and allows radiation of wavelengths greater than 1.8 microns to be transmitted through it. The initial respective positions of the mirror 6 and of the hood 1 can be adjusted in such a manner that the mirror 6 can be arranged facing the silica window 2 for daytime sighting or arranged facing the germanium window 3 for night-time sighting. The changeover from one position to the other is obtained by suitable means; for example, the control mechanism of the hood could be actuated to bring the hood into the required position in relation to the mirror.

If the silica window 2 is arranged facing the mirror 6, the device receives only visible radiation and near infra-red radiation. These two radiations are transmitted by the mirror 8 and are partially refracted by the plate 10 so that visible radiation (0.4–0.7 microns) is received by the detector 11 and near infra-red radiation (0.9–2.5 microns) is received by the detector 13. However, if the germanium window 3 is arranged facing the mirror 6 (as shown in dotted lines in FIG. 1), the device receives radiation in the thermal infra-red range (8 to 13 microns), which is reflected by the dichroic plate 8 towards the detector 9 and radiation in the near infra-red range (greater than 1.8 microns), which is transmitted by the plates 8 and 10 and is received by the detector 13.

As a result of the rotation of the hood 1, the image received by the detectors 9 and 11 may be inclined. In order to correct this inclination, a receiver 14 and prism 15 may be associated with the detector 9 of the thermal infra-red radiation (as shown in FIG. 4), the prism 15, which may be for example a Pechan prism, being rotated under the control of the hood rotation.

FIG. 2 shows an embodiment in which the first dichroic plate to receive the radiation reflected by the mirror 6 is a plate 10 made from germanium which has been subjected to a multidielectric treatment. This plate 10 allows the thermal infra-red radiation to be transmitted through it to be received by a suitable detector 9, while it reflects the visible radiations and near infra-red radiations towards a silica plate 8 which has preferably been subjected to a multidielectric treatment. The plate 8 reflects the visible radiation towards a detector 11 but allows the near infra-red radiation to be transmitted through it towards a detector 13, whose spectral response ranges from, for example about 1.9 microns to about 2.5 microns.

The plates 8 and 10, as well as the associated detectors, are fixed in fixed positions with respect to the axis of the hood, as in the embodiment of FIG. 1.

To bring one of the two windows 2 and 3 into a position co-operating with the dichroic plates and detectors, mechanical means using bearings with locking mechanisms or electromechanical means can be used.

Any particular design of hood can be used with two or more windows. Flat windows are preferably used but any suitable assembly of the windows on the rotating structure can be employed.

What is claimed is:

1. An optical sighting device comprising
   (a) a rotatable hood;
   (b) a first window in said hood made of a material transmitting radiation in a first predetermined range of wavelengths;
   (c) a second window in said hood made of a material transmitting radiation in a second predetermined range of wavelengths;
   (d) a reflecting device capable of receiving radiation in either said first or said second range of wavelengths through the associated window and to reflect it parallel to the axis of rotation of said hood;
   (e) means to rotate said hood relative to said reflecting device to adjust either one of said windows in a working position whereby radiation is transmitted through said window to said reflecting device; and
   (f) means for rotating said reflecting device about said axis for sighting purposes and for rotating said hood as required for maintaining said window in its working position.

2. A sighting device as claimed in claim 1, in which the reflecting device is a mirror suitable for reflecting all radiations transmitted by the windows.

3. A sighting device as claimed in claim 1, in which the first window consists of a silica plate and the second window consists of a germanium plate.

4. A sighting device as claimed in claim 1, which includes two radiation detectors, one of which responds to radiation within the range of transmission of the first window and the other responds to radiation within the range of transmission of the second window.

5. A sighting device as claimed in claim 4, in which one of the detectors responds to radiation in the visible range of radiation and the other detector responds to radiation in the thermal infra-red range of radiation.

6. A sighting device as claimed in claim 5, in which an image receiver is associated with the detector operating in the thermal infra-red range and the image received is projected to a prism to correct the inclination of the image.

7. A sighting device as claimed in claim 4, which includes a third radiation detector which responds to radiation within a range of wavelength which is common to the ranges of transmission of the first and second windows.

8. A sighting device as claimed in claim 7, which the third detector is a goniometer which responds to radiation within a wavelength range from 1.9 microns to 2.5 microns.

9. A sighting device as claimed in claim 7, comprising
   (a) a first, fixed dichroic plate for receiving the radiation reflected by said rotatable reflecting device;
   (b) a first detector;
   (c) said first dichroic plate allowing thermal infrared radiation to be transmitted through it to be received by said detector;
   (d) a second dichroic plate for receiving visible radiation and near infrared radiation reflected by said first dichroic plate;
   (e) a second detector for receiving visible radiation reflected by said second dichroic plate; and
   (f) a third detector for receiving near infrared radiation transmitted to it through said second dichroic plate.

10. A sighting device as claimed in claim 1, comprising
    (a) a first, fixed dichroic plate for receiving the radiation reflected by said rotatable reflecting device;
    (b) a first detector;
    (c) said first dichroic plate reflecting infrared heat radiation towards said first detector;
    (d) a second dichroic plate for receiving visible and near infrared radiation transmitted by said first dichroic plate;
    (e) a second detector for receiving visible radiation reflected by said second dichroic plate; and
    (f) a third detector for receiving near infrared radiation transmitted to it through said second dichroic plate.

* * * * *

UNITED STATES PATENT AND TRADEMARK OFFICE
CERTIFICATE OF CORRECTION

PATENT NO. : 4,158,504

DATED : JUNE 19, 1979

INVENTOR(S) : DOMINIQUE DE PONTEVES ET AL.

It is certified that error appears in the above-identified patent and that said Letters Patent are hereby corrected as shown below:

Please correct the "Assignee" entry for the above-noted patent to read:

--Société de Fabrication d'Instruments de Mesure (S.F.I.M.), Massy, France, and Etat Français, Paris, Armeés, France.--

Signed and Sealed this

Fourth Day of December 1979

[SEAL]

Attest:

Attesting Officer

SIDNEY A. DIAMOND

Commissioner of Patents and Trademarks